United States Patent

Boyles

[15] 3,698,518
[45] Oct. 17, 1972

[54] DISC BRAKE APPARATUS
[72] Inventor: Elmo N. Boyles, Maitland, Fla.
[73] Assignee: Disco Industries, Inc.
[22] Filed: Jan. 14, 1971
[21] Appl. No.: 106,365

[52] U.S. Cl. ............188/72.5, 188/72.6, 197/70.19
[51] Int. Cl. ..........................................F16d 55/228
[58] Field of Search..........188/72.5, 72.4, 72.6, 73.2;
308/6 B, 176; 192/70.19, 70.2

[56] References Cited

UNITED STATES PATENTS

| | | | |
|---|---|---|---|
| 3,348,636 | 10/1967 | Boyles | 188/72.5 X |
| 2,356,258 | 8/1944 | Martin | 188/72.4 |
| 3,429,405 | 2/1969 | Frigger | 188/72.6 X |
| 2,181,988 | 12/1939 | Davis | 188/72.4 X |
| 3,433,328 | 3/1969 | Swift | 188/72.4 |
| 2,754,936 | 7/1956 | Butler | 188/72.5 |

*Primary Examiner*—Evon C. Blunk
*Assistant Examiner*—Bruce H. Stoner, Jr.
*Attorney*—Duckworth & Hobby

[57] ABSTRACT

A vehicle brake apparatus for attachment to the axle of a vehicle having a rotatable disc attached so as to rotate with the wheel of a vehicle and having flanges carried by a housing attached to the axle of the vehicle so that a brakeshoe carried by brakeshoe carrier telescopes in the flanges attached to the axle housing for driving a brake lining on the brakeshoe against he rotating disc. Bearings riding between the brakeshoe carrier and flanges allow the telescoping action when a torque is placed on the brakeshoe.

7 Claims, 7 Drawing Figures

PATENTED OCT 17 1972 3,698,518

Elmo N. Boyles
INVENTOR

By Duckworth & Hobby
Attorneys

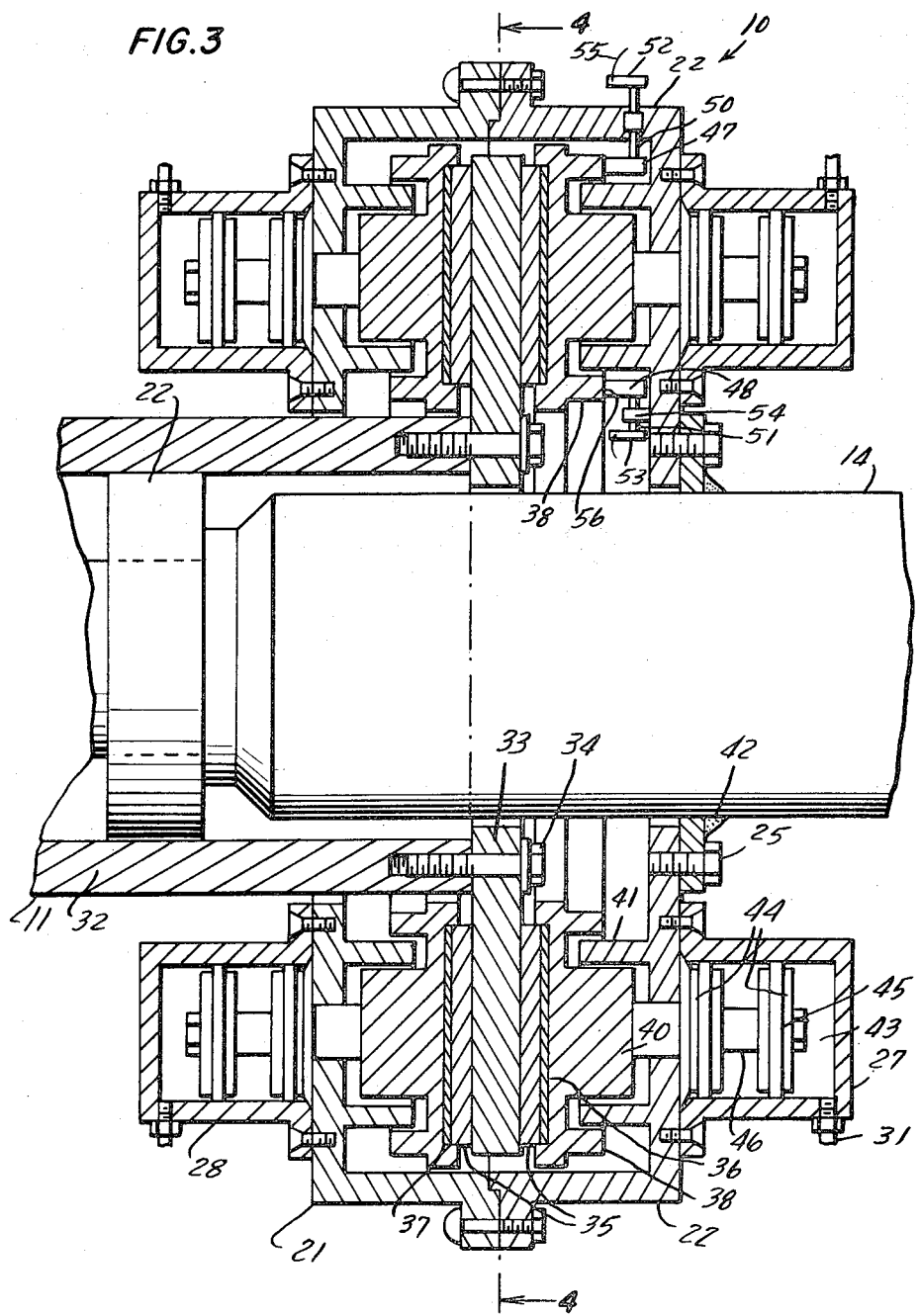

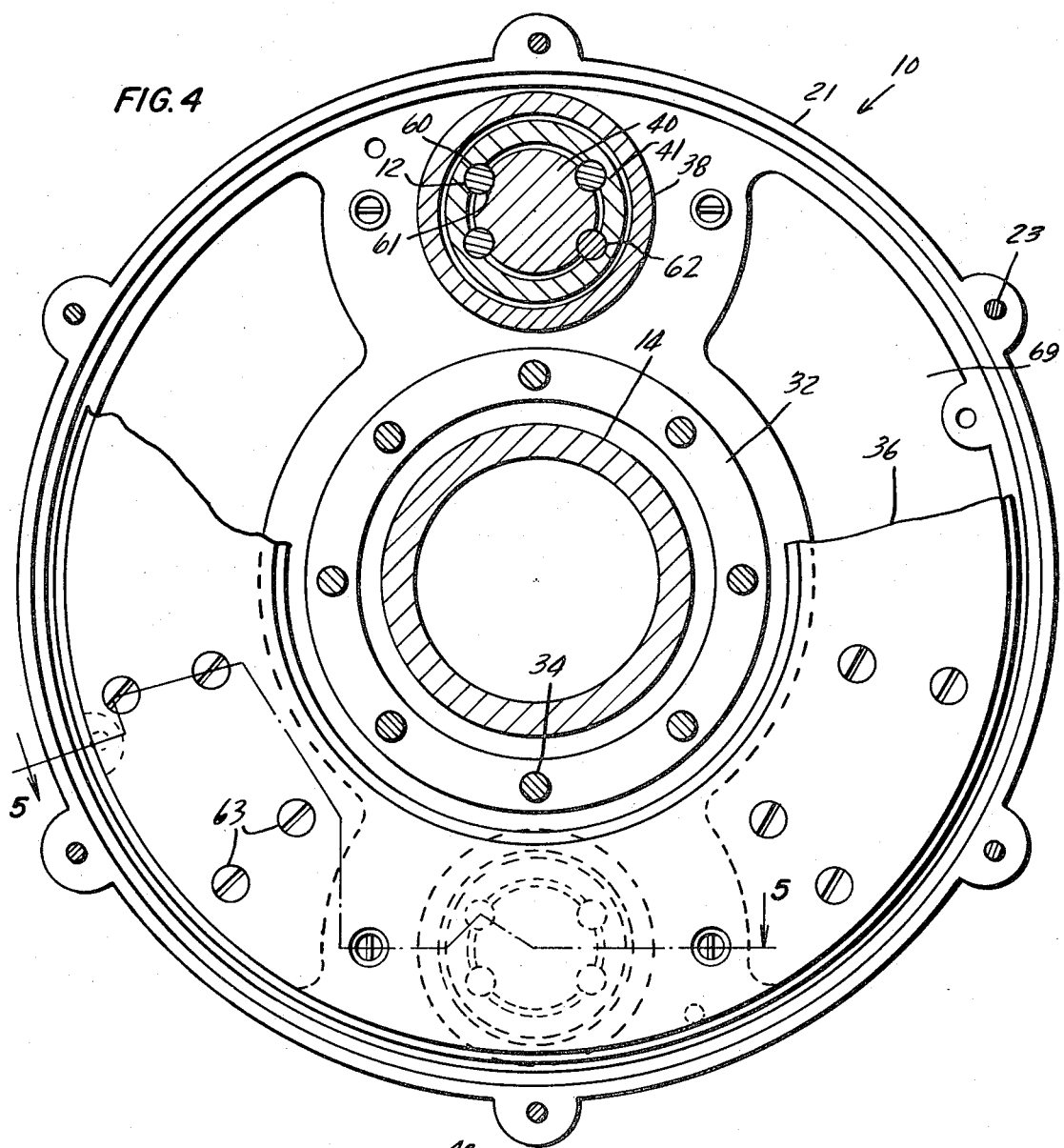
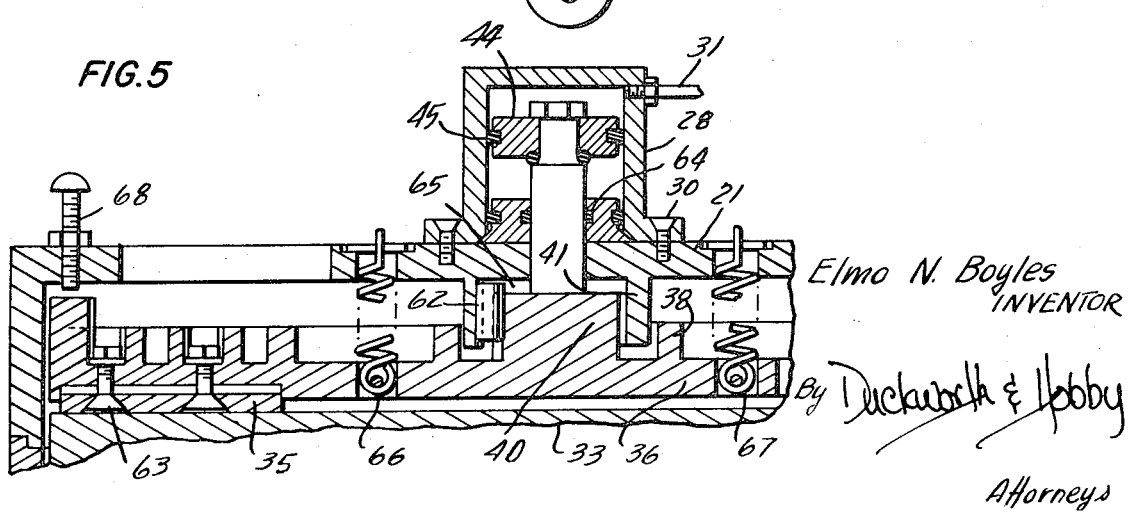

Elmo N. Boyles
INVENTOR

By Duckworth & Hobby
Attorneys

DISC BRAKE APPARATUS

BACKGROUND OF THE INVENTION

The present invention relates to vehicle brakes and more particularly to an improved vehicle brake assembly of the disc type.

In the past it has been common to have vehicles, such as motor vehicles, fitted with shoe type brakes, which generally are internally expanding and hydraulically operated. However, in recent years this disc type brake has become increasingly more common because of the limitations of the shoe type brakes. Disc brakes have generally been of a partial disc type in which an annular brake disc is attached to the rotating wheel and is gripped by pincers having circular or kidney-shaped brake pads with frictional linings to frictionally engage the disc to retard the rotation of the wheel. A large area of the disc has generally provided good results because of the good dissipation of heat generated by the brake, thus improving the fade characteristics of the brakes. Another type of disc brake is referred to as the full disc or enclosed disc brake in which friction linings are attached to a shoe which may completely or partially encircle the axle parallel to the disc. In this type of disc brake the friction pads may be pressed against either side of the disc or alternatively can be pushed outward against the disc built into the brake housing, or the like.

To overcome the problem of chatter in partial disc brakes, some manufacturers have gone to what is known as a floating caliper disc brake which has a free floating caliper to prevent the brake chatter. Many variations of these prior art brake devices have been taught but one such prior art disc brake taught in U.S. Pat. No. 3,348,636, issued Oct. 24, 1967, for a "Guide Means For Disc Brake Friction Pad" to the present inventor may be referred to for background on the present invention. This previous disc brake of the present inventor provided a vehicle brake assembly consisting of a friction brake disc secured on a vehicle wheel, an annular housing secured on the vehicle frame and surrounding the brake disc, pairs of opposite brake shoes in the housing located on opposite sides of the disc, and radially extending exposed hydraulic cylinder blocks carried by the housing on opposite sides of the brake disc, with the blocks containing pistons drivingly connected to the brake shoes. The brake shoes are therein provided at their ends with peripherally grooved guide rollers engaged with transversely extending guide rods secured in the housing to the guide and support the shoes as they move towards and away from the brake disc.

One object of the present invention is to provide an improved disc brake assembly which is relatively simple in construction and which has a high heat dissipating capacity by providing air-cooled segments forming a part of the brake shoe.

Another object of the present invention is to provide an improved disc brake assembly which may be manufactured relatively inexpensively because of the few components involved but which is rugged in construction and resistant to wear while being relatively compact in size and providing a novel telescoping brake shoe sliding on torque absorbing bearings which maintain the alignment of the brake shoe in operation.

SUMMARY OF THE INVENTION

The present invention provides for a disc brake apparatus for vehicles and especially motor vehicles such as trucks, trailers and automobiles, and is attached to the axle of such vehicle which axle has a wheel rotatably attached thereto by means of a hub and adapted to rotate thereon and a rotatable disc fixedly attached to the wheel for rotation therewith. A plurality of cylindrical flanges are attached to the axle housing in a fixed manner on either one or both sides of the rotating disc. One or two brake shoes are slidably connected to the flanges connected to the axle housing by means of a plurality of protruding brake shoe carriers and spaced from the interior of the flanges for telescoping in the axle housing flanges. A plurality of bearings are located between the flanges connected to the axle housing and the brakeshoe carriers for allowing the brake to slide even when the brake shoe has torque placed thereon. An actuating mechanism which may be hydraulically operated drives the brakeshoe carriers and thereby the brake shoe towards the rotating disc and the brake shoe has a brake lining thereon for a frictional engagement with the rotating disc. The brake shoes and brake lining may be segmented with spaces to provide additional cooling and means for operating the brake shoe manually for a hand brake are also provided.

BRIEF DESCRIPTION OF THE DRAWINGS

Other objects, features and advantages of this invention will be apparent from a study of the written description and the drawings, in which

FIG. 3 is a sectional view taken along line 3—3 of FIG. 2;

FIG. 4 is a sectional view taken along line 4—4 of FIG. 3 with additional parts broken away and shown in section;

FIG. 5 is a sectional view taken along line 5—5 of FIG. 4;

DESCRIPTION OF THE PREFERRED EMBODIMENT

Figure 1:
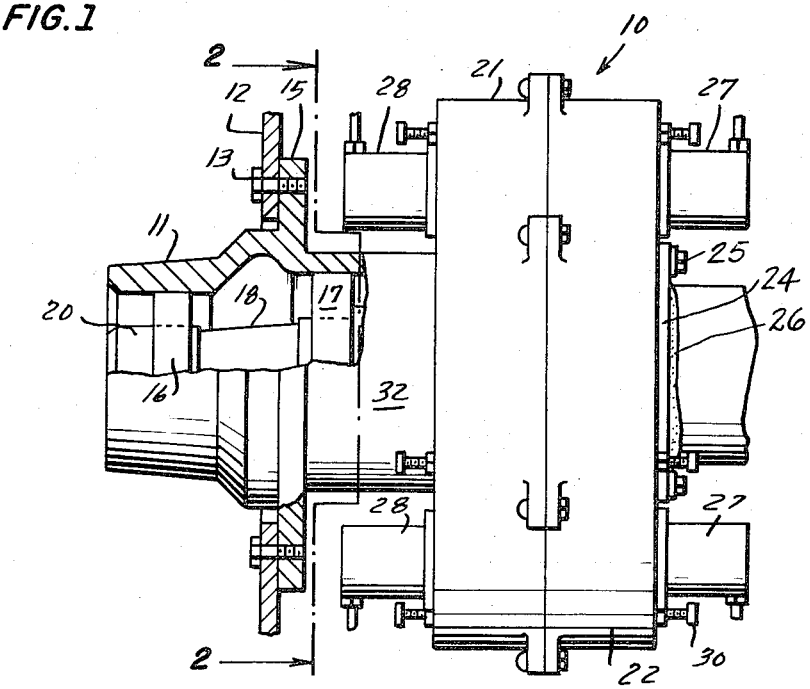
FIG. 1 is a side elevation view of a preferred form of the present invention attached to a typical truck axle illustrated by parts broken away from the mounting means therefor.

Referring to the drawings, FIG. 1 tends generally to designate a wheel brake assembly 10 as constructed in accordance with the present invention and connected to a hub 11, with a wheel 12 attached thereto by bolts 13 and an axle tube 14 may be fixedly attached to a vehicle such as an automobile or truck and is connected to the hub 11 and wheel 12. The bolts 13 pass through the wheel 12 and the hub flange 15. The hub 11 rides on outer bearings 16 and inner bearings 17 and has a spindle 18 with an end portion 20. The brake assembly 10 has an outer housing 21 and an inner housing 22 attached together by nuts and bolts 23. The inner housing is attached to a flange 24 by nuts 25 which flange 24 is welded at 26 to the axle tube 14. A pair of activators 27 are attached to the inner housing and a second pair of activators 28 are attached to the outer housing of the brake assembly 10 which activators are attached by bolts 30 and each has an inlet pipe 31 which may be for a hydraulic or pneumatic line for driving the activators which in turn actuate the brakes as will be described in more detail. The hub 11 has a hub skirt 32 extending into the outer housing 21 of the brake assembly 10 which will have a rotating disc attached to it.

Figure 2:
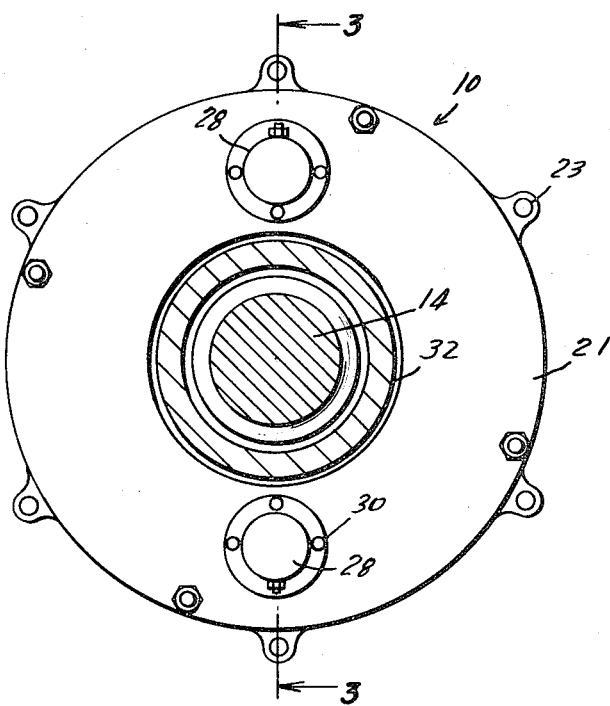
FIG. 2 is a sectional view taken along line 2—2 of FIG. 1 illustrating the mounting means for attaching the brake cylinders thereto.

Turning now to FIG. 2, the brake assembly 10 can be seen having the outer housing 21 attached to the inner housing 22 of FIG. 1 by bolts 23 and has activators 28 attached to the outer housing 21 by bolts 30. The hub skirt 32 can be seen riding around the axle 14.

FIG. 3 more clearly illustrates the operation of the brake assembly 10 attached to the axle 14 for operation with the skirt 32 of the hub 11 which rides on bearing 22, as has already been explained. The hub skirt 32 has an annular brake disc 33 attached thereto by bolts 34 and is adapted to rotate with the hub 11 and in turn with the wheel 12 of FIG. 1. The rotating disc 33 would typically be made of steel or similar metal which can be engaged by a pair of brake linings 35 in a frictional manner for stopping the rotation of the disc 33 and in turn the hub 11 and wheel 12. The brake linings 35 are connected to a brake shoe 36 by small steel plates 37 and may be glued or bolted on as desired. The brake shoe 36 has flanges 38 surrounding and spaced from a solid inner brakeshoe carrier 40 and slides in a telescoping manner on an axle flange 41 which is attached to a flange 24 with the bolts 25 to the axle 14, which flange 24 forms a part of the axle 14 by being welded thereto at 42 before the flange 41 is fixedly attached to the axle 14 while the disc 33 rotates with the wheel. The brake shoe 36 telescopingly slides on flange 41 with the solid brakeshoe carrier 40 acting as a piston for driving the brake shoe, but while being integral with the brake shoe. Hydraulic and pneumatic actuators 27 and 28 are attached to the inner housing 22 and outer housing 21 respectively of the brake assembly 10 and use a hydraulic or pneumatic input 31 filling a chamber 43 to drive piston 44 having seal 45 thereon. These pistons in turn drive a rod 46 which drives a solid cylinder brakeshoe carrier 40 of the brake shoe 36. The pipes 31 may of course be connected for operation through pneumatic or hydraulic systems to the brake pedal of a truck or automobile, or the like. This view also illustrates a pair of camming members 47 and 48 riding on an axis 50 and 51 having torque levers 52 and 53 extending from the shafts 50 and 51. Shaft 50 is held by the inner housing 22 while shaft 51 is held by shaft holding bracket 54 which is attached to the inner housing 22. A pair of cables 55 are attached to the torque levers 52 and 53 whereby pulling these cables will rotate the shafts 50 and 51 and drive the camming members 47 and 48 against the bottom portion 56 of the cylinders 38 to drive the brake shoe 36 and brake lining 35 into engagement with the rotating disc 33. This camming system is used for the operation of the hand brake which is manually operated separate from the hydraulic and pneumatic system.

Referring now to FIGS. 4 and 5, the operation of the brake may be more clearly understood by the sectional view having outer housing 21 of the brake assembly 10 and bolts 23 illustrated along with the axle 14, and the hub skirt 32 attached to the rotating disc 33 by bolts 34. In this view the brakeshoe carrier 40 is located inside the axle housing flange with the brake shoe flange 38 overlapping flange 41 for telescoping action between the flanges. Four bearings 60 are shown located between brakeshoe carrier 40 and flange 41 and engaging notches 61 in brakeshoe carrier 40 and notches 62 in flange 41 are shown and these bearings may be ball or roller bearings or may be simply pieces of metal known as wear plates keeping the brakeshoe carriers 40 and flange 41 in alignment with each other and for accepting the torque of the brake shoe during the braking operation while allowing the brakeshoe carrier 40 and the brake shoe to continue telescoping and applying pressure against the disc. The brake shoe 36 may be seen attached across an open section 69 which open section allows rapid cooling of the brake shoe 36 which is metal along with the metallic brake lining which rapidly transfers the heat through the brake shoe into the open portion 69 where it dissipates heat. Bolts 63 are used for attaching the brake lining to the brake shoes 36 but it will of course be clear that other type of attachments can be used such as gluing, without departing from the spirit and scope of the present invention.

FIG. 5 more clearly shows the activator 28 attached to the outer housing 21 by screws 30 having hydraulic and pneumatic input line 31 with a piston 44 therein having seals 45 and driving a rod 46 through seals 64 through the housing 21 into a chamber 65 for driving the brakeshoe carrier 40 portion of the brake shoe 36. The outer cylinder 38 of the brake shoe may be seen enclosing partially the axle housing flange 41 having bearings 62 slidingly engaging carrier 40 and flange 41. The activators 28 drive the brake shoe 36 in one direction and a pair of springs 66 and 67 place a continuous force pulling the brake shoe away from the disc 33 and therefore normally keeping the brake linings 35 out of contact with the disc 33 and requiring the activators 28 to drive the brake shoe 36 in opposition to springs 66 and 67 for engagement with the disc. A set of adjusting screws 68 are provided for adjusting the maximum return of the brake shoe 36.

Figure 6:
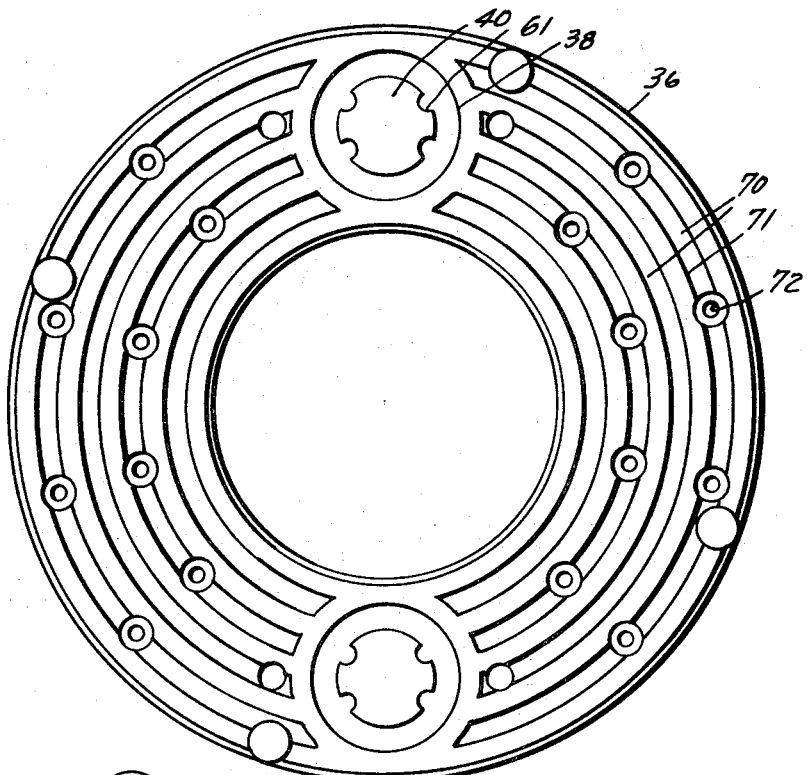
FIG. 6 is an elevation view as seen from the outside of the brake shoe.
Figure 7:
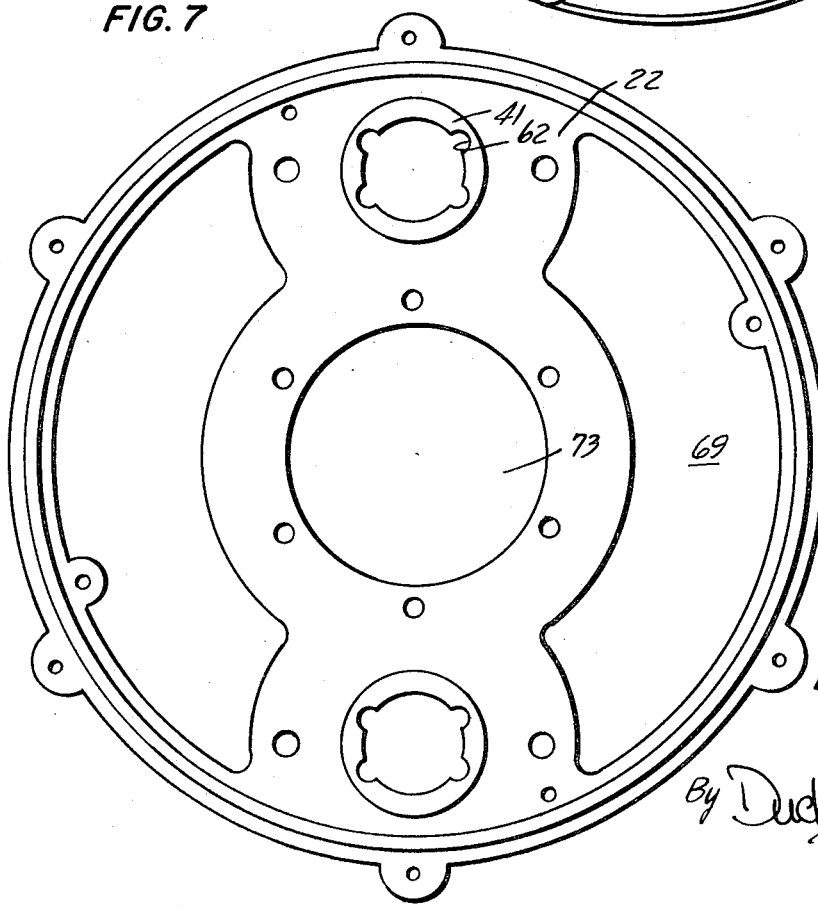
FIG. 7 is an elevational view as seen from the inside of one of the brake shoe housings.

Referring now to FIGS. 6 and 7, FIG. 6 is a view of a brake shoe arrangement having telescoping cylindrical portion 40 and 38 along with notches 61 in the cylindrical portion 40 of the brake shoe 36 having segmented portions 71 with openings 70 therebetween for additional cooling of the brake shoe and having openings 72 therein for bolting the brake lining onto the brake shoe. FIG. 7, on the other hand, illustrates a housing 22 having openings 69 and 73 for the axle and also having flange 41 with bearing notches 62 for engagement with the brake shoe of FIG. 6.

It will be clear to those skilled in the art at this time that a braking assembly has been provided which utilizes full disc or enclosed disc type brakes which is sufficiently open to improve cooling and which may be utilized on trucks or other vehicles on which a rotating wheel is utilized. The present system may be pneumatic or hydraulically operated, as desired, without departing from the spirit and scope of the invention, and the present invention is not to be construed as limited to the particular forms disclosed herein, since these are to be regarded as illustrative rather than restrictive.

I claim:

1. A disc brake apparatus for a vehicle comprising in combination:
   a. axle means attached to a vehicle;
   b. rotatable disc means adapted to be fixedly attached to a vehicle wheel for rotation therewith;
   c. brakeshoe means slidably connected to said axle means, said brakeshoe means having a plurality of protruding brakeshoe carriers;
   d. a brake housing attached to said axle means and including a plurality of axle flanges each flange forming a bore therein on at least one side of said disc means and adapted for said brakeshoe carrier to slidably telescope therein;
   e. a plurality of bearing means located between each said brakeshoe carrier and each said flange on said brake housing adapted to allow telescoping of said brakeshoe means while having torque placed thereon;
   f. actuating means fixedly attached to said brakeshoe housing for actuating said brakeshoe carriers and thereby forcing said brakeshoe means towards said disc means; and
   g. brake lining means attached to said brake shoe means and adapted to frictionally engage said disc means whereby actuation of said actuating means will telescope said brake shoe means having brake lining means attached thereto into frictional contact with said disc means to apply braking force to the inter-connected wheel.

2. The apparatus in accordance with claim 1 in which said brake shoe means with said brake lining means attached thereto includes brake shoes with brake linings located on either side of said disc means, each said brake lining being an annular metallic plate lining adapted for a 360° engagement with said disc means.

3. The apparatus in accordance with claim 2 but including a spring actuated return means for applying a force to said brake shoe means opposite to that applied by said actuating means.

4. The apparatus in accordance with claim 1 in which said brake shoe means has spaced openings therein to allow the free circulation of air therein.

5. The apparatus in accordance with claim 4 including camming means for camming said brakeshoe means into engagement with said disc means by actuation of a cable connected to said camming means.

6. The apparatus in accordance with claim 5 in which said flanges on said brake housing and said brakeshoe carrier are grooved with bearings located in said grooves.

7. The apparatus in accordance with claim 6 in which said actuating means is pneumatically operated.

* * * * *